(12) United States Patent
Sun

(10) Patent No.: US 8,489,768 B2
(45) Date of Patent: Jul. 16, 2013

(54) ASSOCIATED URLVS IN EXCHANGES

(76) Inventor: Chen Sun, Houston, TX (US)

(*) Notice: Subject to any disclaimer, the term of this patent is extended or adjusted under 35 U.S.C. 154(b) by 164 days.

(21) Appl. No.: 13/153,217

(22) Filed: Jun. 3, 2011

(65) Prior Publication Data

US 2012/0066362 A1    Mar. 15, 2012

Related U.S. Application Data

(63) Continuation-in-part of application No. 12/387,545, filed on May 4, 2009, now Pat. No. 7,958,266, which is a continuation-in-part of application No. 10/603,335, filed on Jul. 30, 2003, now Pat. No. 7,543,078, which is a continuation-in-part of application No. 10/190,283, filed on Jul. 5, 2002, now abandoned, which is a continuation of application No. 09/476,632, filed on Dec. 31, 1999, now Pat. No. 6,442,602, said application No. 10/630,335 is a continuation-in-part of application No. 10/189,063, filed on Jul. 2, 2002, now abandoned, and a continuation-in-part of application No. 10/074,081, filed on Feb. 11, 2002, now abandoned, and a continuation-in-part of application No. 09/853,167, filed on May 11, 2001, now abandoned, and a continuation-in-part of application No. 09/642,127, filed on Aug. 18, 2000, now abandoned.

(60) Provisional application No. 61/135,050, filed on Jul. 6, 2008, provisional application No. 61/194,205, filed on Sep. 24, 2008, provisional application No. 60/475,716, filed on Jun. 4, 2003, provisional application No. 60/400,270, filed on Jul. 31, 2002, provisional application No. 60/138,815, filed on Jun. 14, 1999, provisional application No. 60/363,624, filed on Mar. 12, 2002, provisional application No. 60/267,943, filed on Feb. 12, 2001.

(51) Int. Cl.
*G06F 15/16* (2006.01)

(52) U.S. Cl.
USPC ............ 709/245; 709/206; 709/223; 709/218

(58) Field of Classification Search
None
See application file for complete search history.

(56) References Cited

U.S. PATENT DOCUMENTS

| 5,812,769 | A | 9/1998 | Graber et al. |
| 6,085,242 | A * | 7/2000 | Chandra ...................... 709/223 |
| 6,324,538 | B1 * | 11/2001 | Wesinger et al. ............. 709/217 |
| 6,374,259 | B1 * | 4/2002 | Celik ...................... 707/999.01 |

(Continued)

OTHER PUBLICATIONS

Postel, J., "Domain Name System Structure and Delegation", RFC 1591 Network Working Group, Mar. 1, 1994, 7 pages.

(Continued)

*Primary Examiner* — Jeffrey R Swearingen

(57) ABSTRACT

Web individuals' exchanges can be easily created by users inputting in, through a personal access, their identified URLvs from differing second-top level domain names. An associated identities database and a URLv syntax database can verify that these differing second-top domain name URLvs belong to the same individual. Once URLvs are verified, the URLvs are stored in individual's personal data repositories, which can extract data from the stored URLvs' webpages, including through using APIs. The result is that URLvs can be used to easily input data into prior-art web exchanges, or can create new web exchanges by multiple people inputting in their URLvs to the new web exchange. These features enable data portability of the individual's own data and weaken current monopoly individuals' exchange websites.

16 Claims, 8 Drawing Sheets

U.S. PATENT DOCUMENTS

| | | | |
|---|---|---|---|
| 6,442,602 B1 | 8/2002 | Choudhry | |
| 6,487,584 B1 * | 11/2002 | Bunney | 709/206 |
| 6,691,158 B1 * | 2/2004 | Douvikas et al. | 709/219 |
| 7,007,068 B2 * | 2/2006 | Morkel | 709/206 |
| 7,062,561 B1 * | 6/2006 | Reisman | 709/227 |
| 7,302,634 B2 * | 11/2007 | Lucovsky et al. | 709/217 |
| 7,543,078 B2 | 6/2009 | Sun | |
| 7,564,962 B1 | 7/2009 | O'Keeffe | |
| 7,698,426 B2 * | 4/2010 | Thayer et al. | 709/225 |
| 7,848,781 B2 * | 12/2010 | Bhat et al. | 455/558 |
| 2002/0152265 A1 | 10/2002 | Felman | |
| 2002/0188606 A1 | 12/2002 | Sun | |
| 2006/3005092 | 3/2003 | Sun | |
| 2004/0205243 A1 * | 10/2004 | Hurvig et al. | 709/245 |
| 2008/0205655 A1 * | 8/2008 | Wilkins et al. | 709/206 |
| 2009/0234970 A1 | 9/2009 | Sun | |
| 2010/0198854 A1 * | 8/2010 | Chitturi et al. | 707/760 |

OTHER PUBLICATIONS

Mockapetris, P., "Domain Names—Concepts and Facilities", RFC 1034 Network Working Group, Nov. 1, 1987, 55 pages.

\* cited by examiner

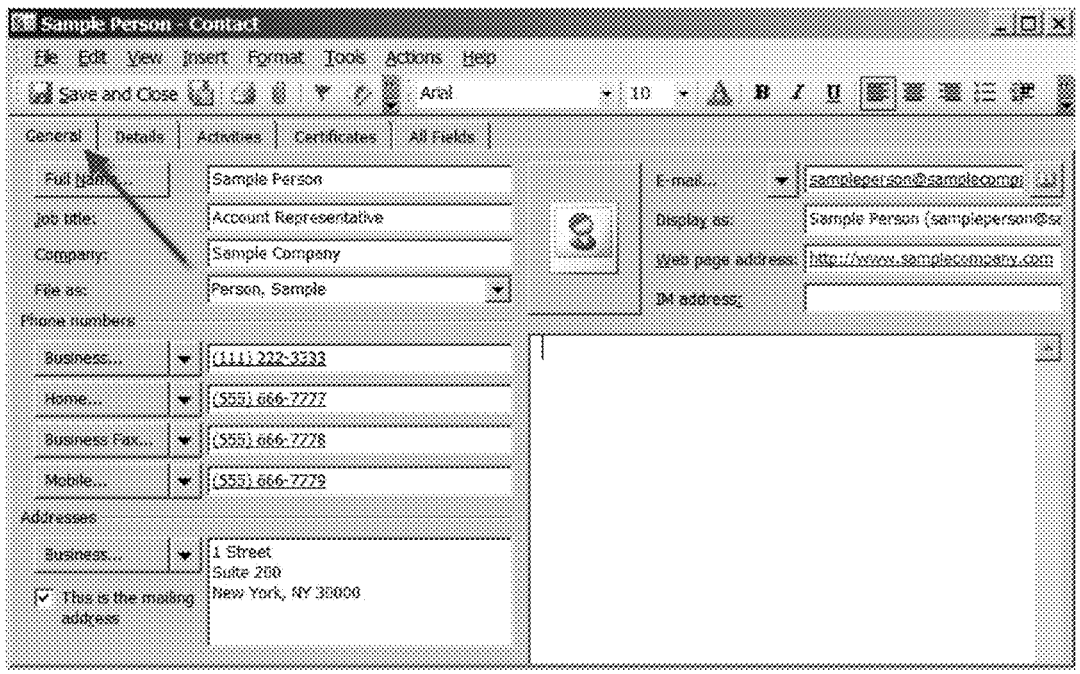
Figure 1a Outlook 2003, Contact Entity—General View
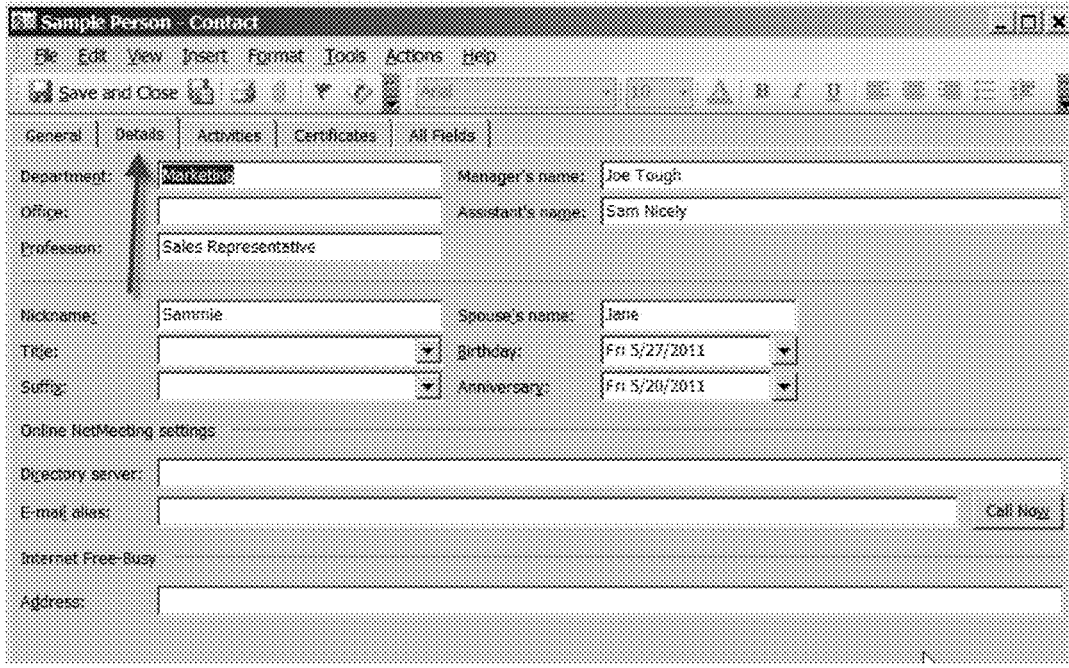
Figure 1b--Outlook 2003, Contact Entity—Details View
Figure 1: 1a & 1b, Prior Art

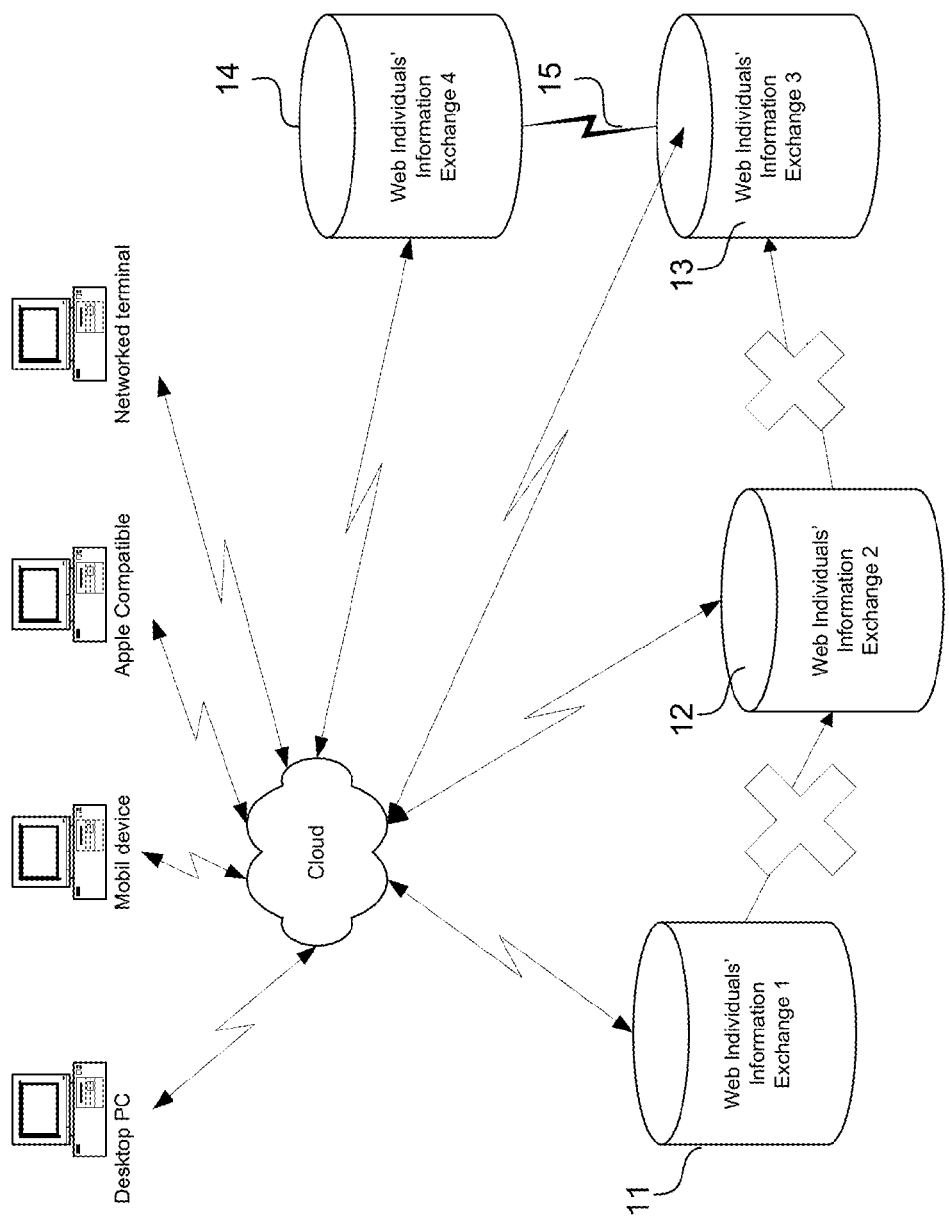
Figure 2, (Prior Art)

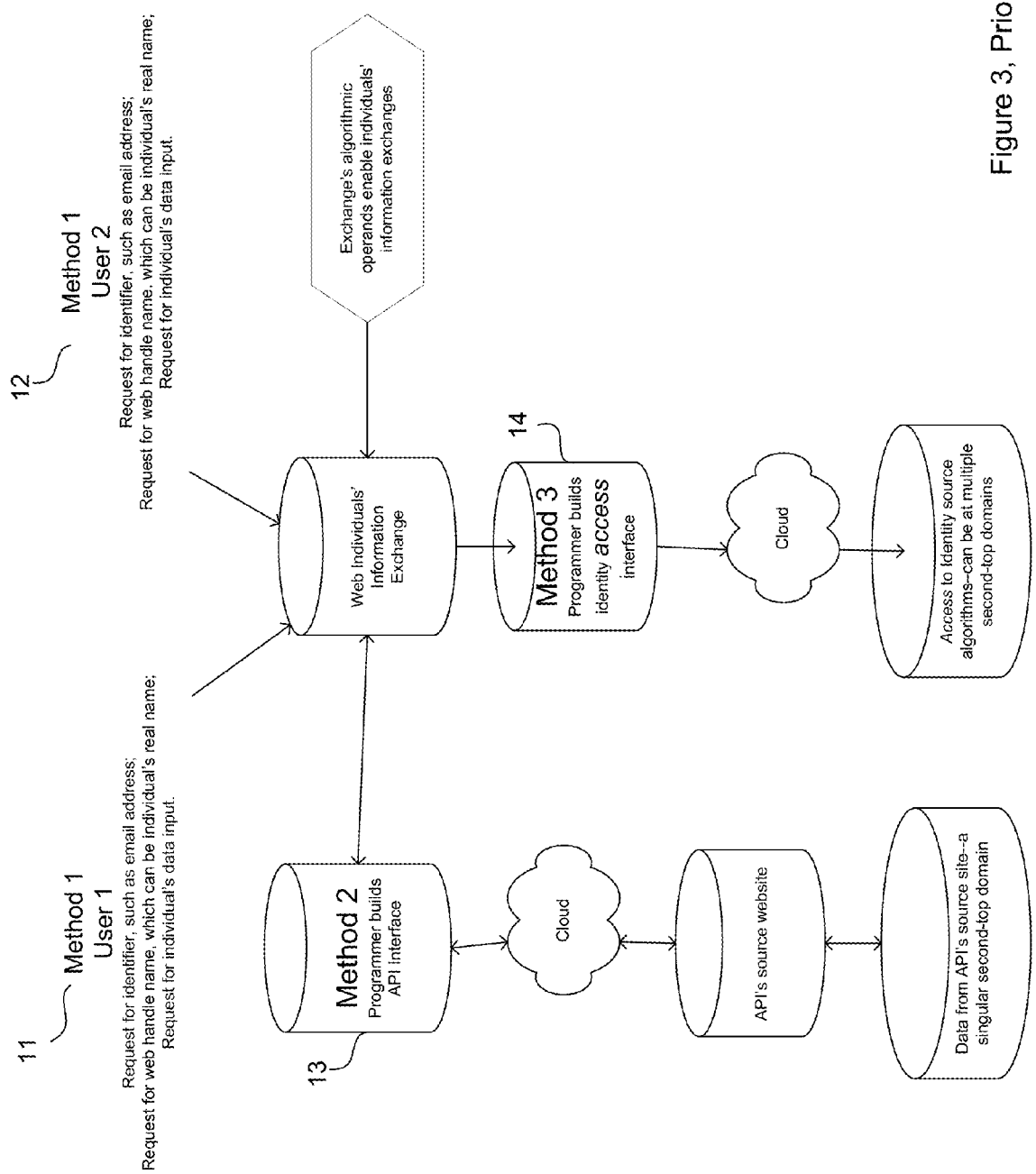
Figure 3, Prior Art

ASSOCIATED URLVS IN EXCHANGES

CROSS-REFERENCE TO RELATED APPLICATIONS

This application is a continuation-in-part of co-pending U.S. application Ser. No. 12/387,545, filed May 4, 2009, and entitled "Multiple URL Identity Syntaxes and Identities." Accordingly, this application claims benefit of U.S. patent application Ser. No. 12/387,545 under 35 U.S.C. §120.

U.S. patent application Ser. No. 12/387,545 claims priority to expired U.S. Provisional Application Ser. No. 61/135,050, filed on Jul. 16, 2008, and expired U.S. Provisional Application Ser. No. 61/194,205, filed on Sep. 24, 2008, and is a continuation-in-part of issued U.S. Pat. No. 7,543,078, filed on Jul. 30, 2003, and entitled "Individuals' URL Identity Exchange and Communications."

U.S. Pat. No. 7,543,078 is the issued patent for U.S. patent application Ser. No. 10/630,335. U.S. patent application Ser. No. 10/630,335 claims priority to expired U.S. Provisional Application Ser. No. 60/475,716 filed on Jun. 4, 2003 and entitled "Knowledgeable Customer Points, Contacts Management Using URLs, Individual Representation and I Web Floral," and expired U.S. Provisional Application Ser. No. 60/400,270, filed on Jul. 31, 2002 and entitled "Individuals' Marketplace Using subdomain.domain/filesuffix." U.S. patent application Ser. No. 10/630,335 is a continuation-in-part of abandoned U.S. application Ser. No. 10/190,283, filed on Jul. 5, 2002 and entitled "System and Method for Dynamic Creation and Management of Virtual Subdomain Addresses;" abandoned U.S. patent application Ser. No. 10/189,063, filed on Jul. 2, 2002 and entitled "Virtual Subdomain Address File Suffix;" abandoned U.S. application Ser. No. 10/074,081, filed on Feb. 11, 2002 and entitled "Contacts Management Using Virtual Subdomains;" abandoned U.S. application Ser. No. 09/853,167, filed on May 11, 2001 and entitled "Organizing and Accessing Electronic Business Cards by Virtual Subdomain;" and abandoned U.S. application Ser. No. 09/642,127, filed on Aug. 18, 2000 and entitled "System and Method for Interactive Data Services Using Virtual Subdomain Addresses."

U.S. application Ser. No. 10/190,283 claims priority to expired U.S. Provisional Application Ser. No. 60/138,815, filed on Jun. 14, 1999 and entitled "Process of Creating Dynamic Content from Virtual Sub-Domains," and is a continuation of issued U.S. Pat. No. 6,442,502, filed on Dec. 31, 1999 and entitled "System and Method for Dynamic Creation and Management of Virtual Subdomain Addresses."

U.S. application Ser. No. 09/476,632 also claims priority to expired U.S. Provisional Application Ser. No. 60/138,815.

U.S. application Ser. No. 10/189,063 claims priority to expired U.S. Provisional Application Ser. No. 60/363,624, filed on Mar. 12, 2002 and entitled "Virtual Subdomain Address File Suffix."

U.S. application Ser. No. 10/074,881 claims priority to expired U.S. Provisional Application Ser. No. 60/267,943, filed on Feb. 12, 2001 and entitled "C2B eSearchGen & Other Products."

All listed U.S. patent applications and U.S. Provisional Patent Applications are hereby incorporated in their entirety.

INCORPORATION BY REFERENCE

U.S. Pat. No. 6,442,602, U.S. application Ser. No. 09/642,127 filed by Azkar Choudhry on Aug. 18, 2000 and Ser. No. 10/190,283 filed Jul. 5, 2002; U.S. application Ser. No. 09/853,167 filed jointly by Chen Sun and Azkar Choudhry on May 11, 2001; and U.S. application Ser. Nos. 10/074,081, 10/189,063, 10/190,283, and 10/630,335 filed by Chen Sun on Feb. 1, 2002, Jul. 2, 2002, Jul. 5, 2002, and Jul. 30, 2003 respectively; are incorporated herein by reference in their entirety, including drawings, and are hereby made a part of this application.

TECHNICAL FIELD OF INVENTION

This invention relates to personal digital representation, multiple-identities, input of data into web individuals' exchanges, and individuals' web data repositories.

BACKGROUND

Web multi-user databases coupled with individuals' exchange algorithms have create marvelous individuals' information exchanges, some examples being eCommerce markets, social networks, matchmaking sites, business-networking, and other personal information exchanges. The essence of these includes a multi-user web database system with characteristics such as: each individual is represented by a database name and has a database entity that can represent, consolidate, or point to the individual's data, and the database's individuals can exchange data information with other individuals in the exchange website. A web database system is frequently composed of numerous databases.

Such individuals' exchange websites usually issue a web name (which can be a person's real name) to act as the web database system's individual. This web name can further have database individual's identifiers, IDs, unique numbers, primary keys, and other names, within the web database system's databases.

Examples of individuals' exchanges include: eBay.com, an eCommerce marketplace in which an individual's web handle name is coupled with his for-sale items. Match.com and eHarmony.com dating services, in which an individual's web handle name is coupled with his consolidated dating profile(s). Facebook.com, a social network in which a person's real name is used as his website user name that is coupled with his online social activities.

A prior art means of transferring individuals' data used by the exchange websites are programmers' APIs (Application Programming Interface), such as the Facebook.com's or Twitter's current APIs. Such APIs have disadvantages for the site users:
1. The programmer-controlled APIs tend to be inflexible as to which data the user can select to transfer.
2. The exchange websites utilize restrictive-to-domain users' web names, such that users need different web names in different API websites. This further causes the Internet to split into walled gardens, such as the popular Facebook.com, Linkedin.com, MySpace.com, and Twitter.com.
3. The restrictive-to-domain web names and their associated data foster monopolies as Facebook.com, eBay.com, Linkedin and Twitter.com. These monopolies' numerous members' networking effect create high barriers-to-entry for potential competitors, because it is very time-consuming for numerous members to transfer their data from these monopolies to establish another site with numerous members networking effect.

In prior patent applications SSIRA and Multi-ID, Sun explained how to use URLv syntaxes for individuals' naming and how URLvs can form contact entities with contact managers. This patent application explains how URLvs can form individual's consolidated entities within web exchanges.

SUMMARY

URLs are internationally understood, making URL syntaxes containing identities a feasible standard for individuals' representation and data exchange. Prior-art web communities (a.k.a. web exchanges) are powerful socially, politically, and economically. Individuals usually have their web data on multiple communities.

This invention enables individuals to selectively input their URLvs from different domain names into exchange websites. The individual uses a personal URLv access to input his selected URLvs, and the exchange website would use an associated and identified database to verify that the individual is authorized to input the URLvs. Once verified, the inputted URLvs can extract their webpages' data to form individual's consolidated entities within the exchange website's database system. The exchange website can then use its prior algorithms on users to create its exchange features. The result is that individuals will have highly efficient data input and data portability.

While the disclosure contained herein has set forth a number of embodiments of the invention, and many of the fundamental components used within the invention are well known within the art, it will be appreciated by those skilled in the art that variations to the combination of elements and steps disclosed can be made without departing from the scope and spirit of the invention. Accordingly, the scope of the invention should be limited only by the attached claims.

BRIEF DESCRIPTION OF DRAWINGS

FIG. 1 includes prior art FIGS. 1*a* and 1*b* and shows screenshots.

FIGS. 2 and 3 (prior art) show flow diagrams.

TERMINOLOGY

Figure 4:
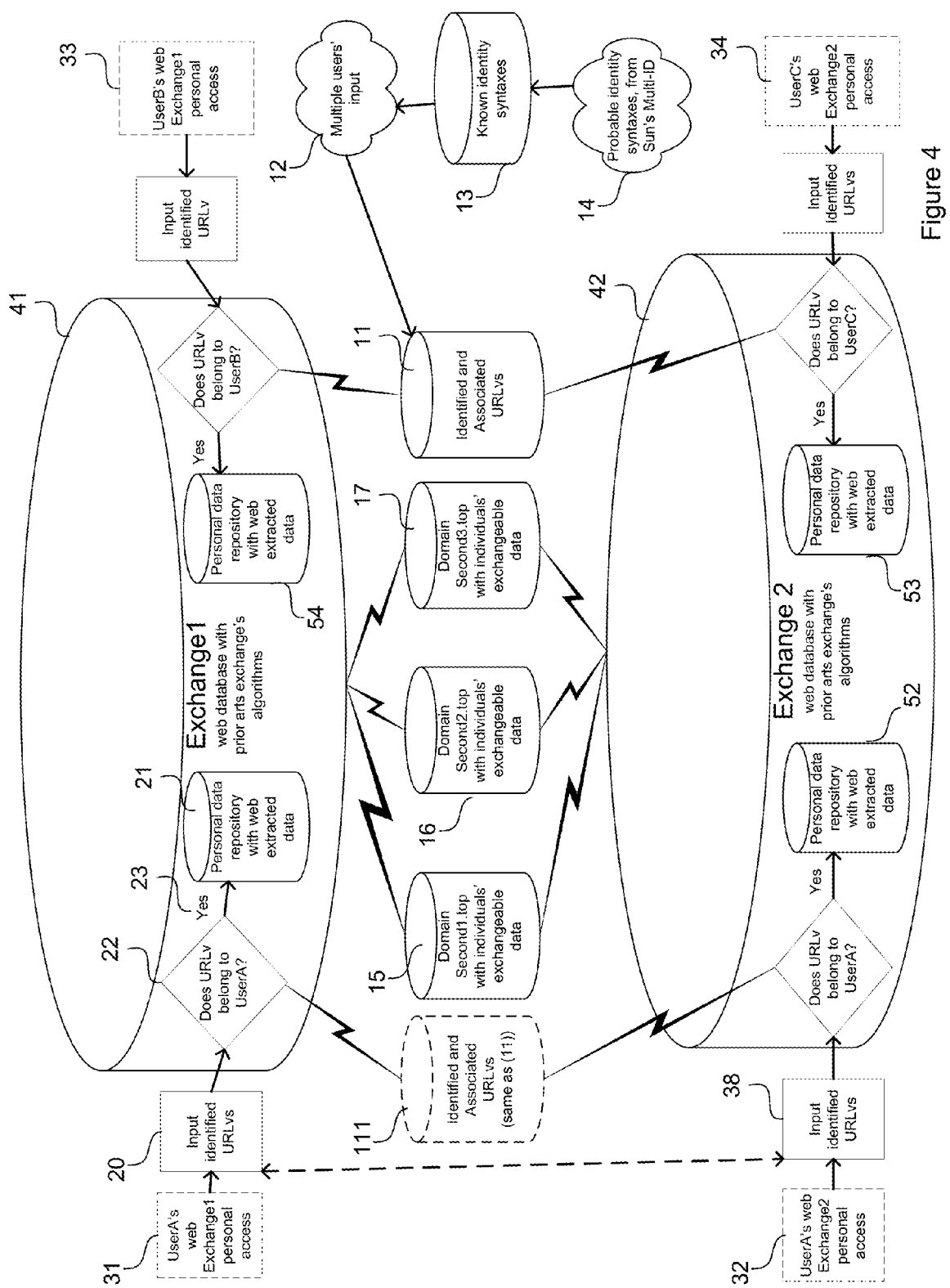
FIGS. 4-8 show flow diagrams in accordance with one or more embodiments of the invention.

Many of the terms used in this application are similar to those in SSIRA and Multi-ID.

URLvs (URL verbals)—are URLs without the "http:" prefix, and the individual's name representation can be within the URLv. A specific URLv and its web content is an individual's profile. Examples of named URLv syntax are [Name.AnyDomainName.com/Personal] and [www.MySpace.com/Name].

SSIRA—Set-Syntax-Identity Repository Application—U.S. patent application Ser. No. 10/630,335, titled "Individuals' URL Identity Exchange and Communications". SSIRA's personal data repository can extract, select, sort, organize, prioritize, and consolidate URLvs web-accessed data based on named-third.second.top domains syntax.

Multi-ID—U.S. patent application Ser. No. 12/387,545, titled "Multiple URL Identity Syntaxes and Identities". Multi-ID's personal data repository can additionally accept URLvs from multiple second-top domains and associate these to an individual.

Formatting of names will facilitate easier reading. The identity is a text string in the URL to be manipulated, and uses { } marks, for example, {Steve.ABC.com}. A URLv syntax is identified in [ ], as in ABC.com's URLv syntax is [Name.ABC.com]. Each of Steve.ABC.com's URLv profiles is web addressable and underlined: Steve.ABC.com and Steve.ABC.com/FS1.

URLv Identity syntax—the URLv syntax for an individual's name within a URLv.

For example, consider http://Steve.ABC.com/Janis. If "Steve.ABC.com" is the identity; then "ABC.com/Janis" is not the identity. The URLv identity syntax for ABC.com is [NAME.ABC.com], where NAME is the individual's name.

Another example—www.Myspace.com/Steve/Janis If "Myspace.com/Steve" is the identity, then the URLv identity syntax for Myspace.com is [Myspace.com/NAME]

Profile—one of several web addressable pages of the same identity.

Name, when used for a person's name—an individual's name or representation of his name. That is, instead of Joseph A. Smith, it can be Joe, JoeSmith, or even a representation for him, such as JoeBob or even a HandleName1355. Name, when used in domains structure, means the DNS domain's names—top, second, third . . . .

Identity—a computer manageable text representation in a URLv of an individual's name. Encoded identity in URLv—a computer manageable text that has an individual's encoded name within the URLv, usually a number or non-comprehensible text. "Identity" in quote marks, means a representation name used by an identity system.

Individual's identifier code—a code to represent an individual in a data field used by a database system. A.k.a. individual's identifier.

A person is a human being. A user is a person using a software application. An individual refers to a specific person, and often, in this application, the individual can be represented by an identity name in his URLv.

Correlate is a probability and statistics (hereafter a.k.a. probability-statistics) method. Associate in the context of identities means acceptable degree of correlation to join as one. Associate in the context of individual's data carries the sense of belonging to the individual. Data associated to an individual can mean the data is inputted by the individual, is controlled by the individual, or is an attribute of the individual.

Contact entity—an individual's representation with his associated data in a contact manager. For example, a contact entity of an individual in Microsoft Outlook's or ACT contact manager (FIG. 1, Prior Art). A contact entity is usually a limited form of individual's consolidated entity, its limitations described below.

Individual's consolidated entity—a database system's object or representation of an individual and his data, usually formed by consolidating various data sources of an individual. The commonly-seen contact entity can help explain. In Outlook 2003, a contact entity's first page view (General Page) (FIG. 1*a*) displays an individual's name, telephone number, email address, physical address, company name, and more in data fields The contact entity's second page view (Details Page) (FIG. 1*b*) displays birthday, supervisor name, nick name, department, and more in data fields. There are three more page views with this Outlook 2003 contact entity—Activities, Certificates, All Fields.

A contact entity is a limited type of individual's consolidated entity. Both have an underlying database field with an individual's identifier code (a.k.a. individual's identifier) indicating the entity's data are associated with the individual. Just as the contact entity can have different page views, an individual's consolidated entity can have differing information views. The contact entity can be derived from multiple separate databases, for example, Outlook's database system can contain a database for company information and a database for persons. The individual's consolidated entity can also be derived from multiple databases, for example, an eCommerce exchange's database system can contain a database for products and a database for persons' web handle names.

A contacts manager's algorithms can act upon its contact entities, just as a web exchange's algorithms can act upon its individual consolidated entities. Different contact managers and their contact entities can have different data fields, information page views, and algorithms. Similarly, different web exchanges and their individual's consolidated entities can have different data fields, information page views, and algorithms. In short, the contact entity operates as an individual in a contact manager, and comparably, the individual's consolidated entity operates as an individual in a web exchange.

One of contact entity's limitations is that it normally does not interact with other contact entities in the same database system. For example, Joe Smith contact entity and Mary Jones contact entity do not interact in Outlook 2003. However, an individual's consolidated entity can interact with other individual consolidated entities in the same database system. For example, Joe Smith, seller in eBay, can sell to Mary Jones, buyer in eBay. Another difference is that a contact entity is unconcerned about misrepresentation, as a contact manager is generally a personal-use device. Oppositely, an individual's consolidated entity is concerned with possible misrepresentation, as a web exchange is a multiple users' service.

Here are some more explanations of individual consolidated entity. Typically in a web exchange, an individual has a web name (which can be his real name), and this web name can further have an individual's identifier, IDs, unique numbers, primary keys, and other names, within the web database system's databases, including relational databases. This web name (usually through an individual's identifier in a database field) can represent, consolidate, or point to the individual's data, and forms what distinguishes one person from another in an exchange website.

Different web exchange's individual's consolidated entities properties are different. As examples, an eBay.com's web handle named seller has an individual's identifier that can point to his products, ratings, payment histories, transactions histories, and more. Another example, a social network user's real name is translated to an individual's identifier in a data field, and this identifier can be used to point to the individual's social relationships established and his postings. A third example, an individual registers for an online discussion forum, which issues him a unique web handle name in its individual's identifier data field to identify users. His web handle name can be used to point to all his discussion postings.

Additionally, just as the same person's contact entity can have different Outlook contact manager's page views, the same individual's consolidated entity can also have different information views in the web exchange's different uses. For example, an eBay seller's "page view" may consolidate his web handle name, his individual's identifier, his products for sale, and their prices. The same seller can be an eBay buyer with a different "page view", now consolidated with his web handle name, his individual's identifier, and his purchase interests and ratings.

FIG. 1's contact entity's "All Fields" tab, a view that shows access to nearly all the contact entity's data fields, is analogous to an individual's consolidated entity's access to most data fields in a web exchange. Unlike a contact entity, individual's consolidated entities interact and can create additional data fields based on these interactions, e.g. sales and purchases history fields.

Generally, the individual's identifier code would be included within the individual's consolidated entity. Additionally, in the embodiments, the URLvs web data can be extracted, consolidated, and displayed, along with the URLvs.

DETAILED DESCRIPTION

Many firms have attempted to establish a universal individual's "identity" system and its associated data access system; the word "identity" in these systems usually means a unique, universal representation of a real-life person. Microsoft Passport and Liberty Alliance were unsuccessful "identity" system offerings; Facebook has limited success using an API that enables for some data exchange. Most of these "identities" use a singular second-top domain. OpenID can use multiple second-top domains, but is more of a login rather than a individual's representation and associated data transfer system. In most of the remainder of this application, the word identity (not in quote marks) means instead a computer manageable text representation of an individual's name in a URLv.

FIG. 2 shows the current condition of individuals' data transfer among websites—innumerable exchange websites that do not transfer data with other websites. For examples, the web handle names from eBay.com's (Web Information Exchange 1, ((11), FIG. 2)) do not directly communicate with Meetup.com's web handle names (Web Information Exchange 4, ((14), FIG. 2)). Meetup.com can use Facebook.com's API (Web Information Exchange 3's API ((13), (15) FIG. 2) to transfer some individual's information, but the transfer data selection requires extra user steps. And because eBay.com and Facebook.com are rivals for web users, there is no direct individuals' data transfer between eBay and Facebook users.

Individuals' exchanges are influential—for example, Facebook users toppled Egypt's government, and social networking campaigning regularly influence American elections. National interests will ensure that no singular second-top domain name, e.g. the popular American-based Facebook.com, will become a universal "identity" standard across all websites. Yet, URLs and its domain names are internationally adopted, hence, are an opportunity for universal individuals' naming and data transfers.

FIG. 3 shows how a prior-art individuals' exchange website gains its users' data. Method 1 ((11) and (12), FIG. 3) is users' manual input, a time-wasting, repetitive process. Method 2 ((13), FIG. 3) is that a programmer uses an API from a second website to access the second website's individual's data. Its limitations include: limited data types from a singular second-top domain website and the user (not the programmer) is unable to easily selectively transfer his data. Method 3 ((14), FIG. 3) is where a URL from any second-top domain name gains website access; Open-ID is similar, but Open-ID is more of a login instead of selective data transfer.

FIG. 4—Selectively Inputting URLvs into Web Exchanges through Personal Access Input FIG. 4 shows an embodiment of the invention. The associated identity database ((11), FIG. 4) is formed by statistical correlation of multiple users' personal data repositories' commonly held URLvs ((12, 13, 14), FIG. 4), a process described fully in Multi-ID. The associated identities database is numbered both as (11) and (111) in FIGS. 3, 4, 6 and has a modified version numbered as (70) in FIGS. 4, 5. Two web exchanges ((41, 42) FIG. 4) are also shown, each with personal data repositories ((21, 52, 53, 54), FIG. 4). These personal data repositories can web access second-top domain name websites ((15, 16, 17) FIG. 4). Multi-ID explained that an individual's webpages' data can be consolidated to form a single entity object by using the associated identities database and URLv's webpage data extraction.

To use the invention, the individual first inputs his data at his originating second-top domains ((15), (16), (17) FIG. 4). Then the individual gains personal access to one exchange, ((31), FIG. 4) to selectively input his own URLvs ((20), FIG. 4) to his personal data repository ((21), FIG. 4). Except for the initial URLv input, his URLvs identities are checked for his ownership ((22), FIG. 4) against the associated identities database ((111), FIG. 4). If confirmed ((23), FIG. 4), these URLvs are permitted into his personal data repository ((21), FIG. 4), which can then extract, organize and consolidate the URLvs' web data, to form its database system's individual's consolidated entity. For Exchange 2 ((42), FIG. 4), UserA has a different personal access entry ((32), FIG. 4), and then selectively inputs his URLvs ((38), FIG. 4). Notice UserA's URLvs' easy data portability from Exchange 1 to Exchange 2.

FIG. 4 also shows a second ((33), FIG. 4) and third web individual ((34), FIG. 4)), with their own personal data repositories and personal exchange accesses. A community can be quickly formed because multiple individuals' URLvs input can be hundreds to thousands of times faster in data transfer than their webpages' contents' manual data input. When compared to traditional API input, the URLvs' input enables users' to efficiently select data, through simple URLvs. This improved users' data portability help break the former web monopolies because much of these monopolies' barriers-to-entry is the excessive time involved in multiple individuals' data transfer to another exchange website.

For example, identities {Steve.ABC.com} and {DEF.com/Steve} are associated to a person Steve in the associated identities database ((11 and 111), FIG. 4). A person accesses and submits URLvs Steve.ABC.com/Chevy and DEF.com/Steve/Ford to Steve's personal data repository ((21), FIG. 4) in the web exchange ((41), FIG. 4). The web exchange would confirm ((22), FIG. 4) with the associated identities database that both URLvs' identities are associated with Steve, and then input into Steve's personal data repository.

Steve's personal data repository can extract data from these URLvs' webpages and consolidate their cars data into Steve's individual's consolidated entity, which is acting as a car seller in this car web exchange. "Steve" now can sell his Chevy and Ford cars using the web exchange's existing individuals' exchange algorithms, comparable to his selling cars as an eBay car seller. To become a seller, Steve inputted only two URLvs instead of multiple cars' data.

Figure 5:
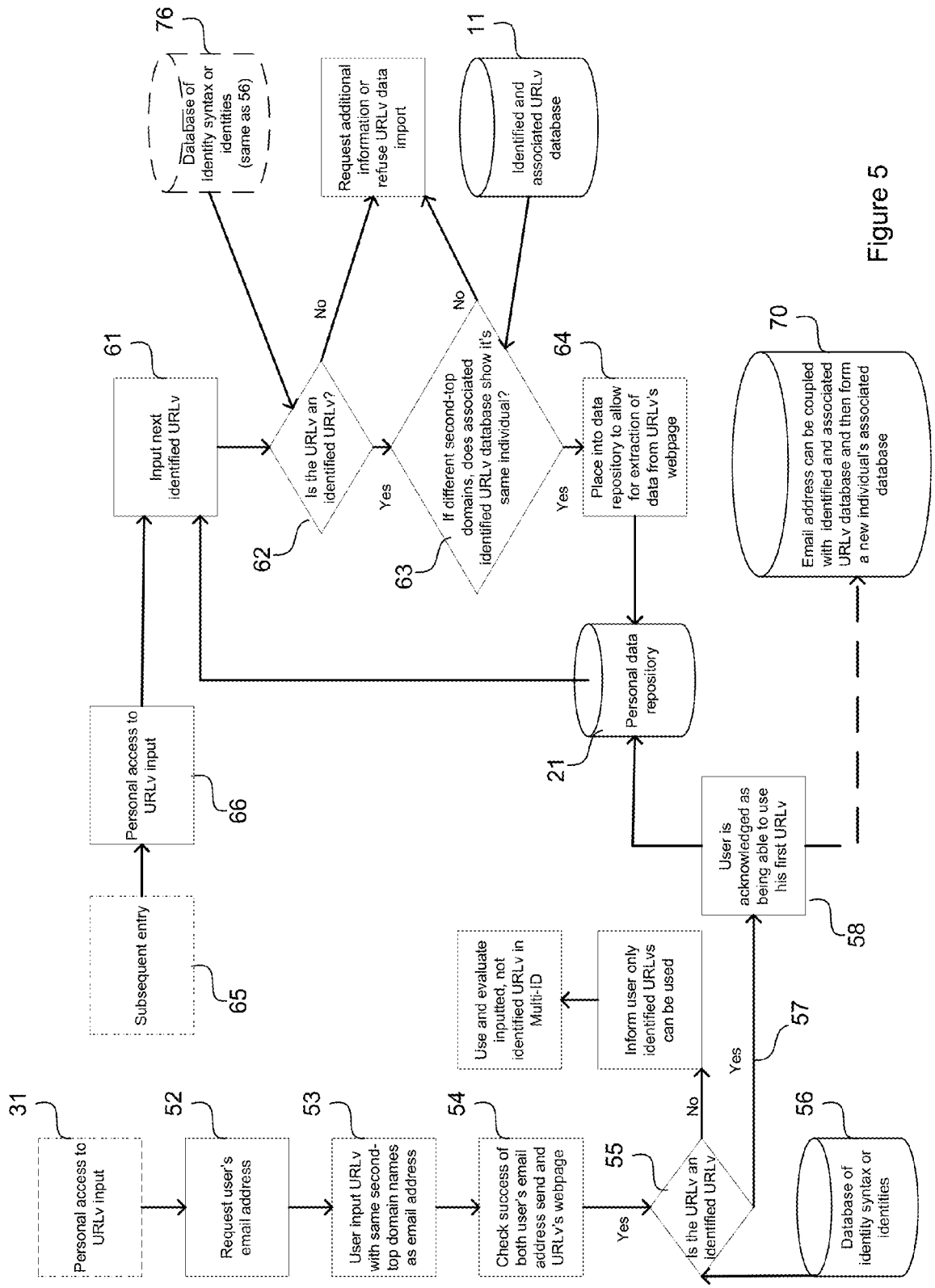

FIG. 5—Reducing Misrepresentation, a Detail of FIG. 4

A well-known problem with individuals' web exchanges (commonly called web communities) is users' misrepresentations, and here, the potential misrepresentation involves users falsely claiming they are co-branded with certain second.top domains (which usually represents organizations, as explained in SSIRA). Suppose Carl wanted to misrepresent and inputted Steve.ABC.com/Chevy into Carl's personal data repository. The associated identities database can detect that Carl is not authorized to input Steve's URLvs.

After the URLv submission ((20), FIG. 4), a step checks that the user's submitted URLvs belongs to his second-top domain's organization and to him ((111), (22), FIG. 4). In a sense, the second-top domain owner vouches for the user's URLv's co-branding. FIG. 5 is a detail of UserA's FIG. 4 steps (111) (20), (21), (22), (23), (31). To facilitate understanding, FIGS. 4 and 5's core parts' numberings are same: the personal access entry (31), the identified and associated identities database ((11), (111)), and the personal data repository (21).

In FIG. 5, each user first registers for the exchange's personal entry access ((31), FIG. 5) leading to his personal data repository ((21), FIG. 5). This personal entry access can be a member login page, with or without a password. For example, the exchange can request user for his email address ((52), FIG. 5) and for an URLv with same second-top domain name as the email address ((53), FIG. 5). As SSIRA explained and as well known, a second-top domain name usage indicates its second-top domain's owner granted (vouched for and is implicitly branded with) the user's permission.

If user confirms his submitted email address (e.g. click on an emailed confirmation link), then the embodiment further checks whether the inputted URLv is active (such as, no http: error code received upon a web call) ((54), FIG. 5) and checks its identity ((55-56), FIG. 5). If identified ((57-58) FIG. 5), the URLv is inputted into the personal data repository ((21), FIG. 5).

In subsequent, different-identitied URLv inputs ((61), FIG. 5), the URLvs are verified by checking whether it carries an associated identity of the same individual ((63), FIG. 5), using the associated identities database ((11), FIG. 5), a process explained by Multi-ID. An optional step can also check for an identity ((62), FIG. 5), using the database of identity syntaxes ((76), FIG. 5; which is same as (56), FIG. 5). If confirmed, the URLv and/or its webpage's extracted data is inputted into the personal data repository ((21), FIG. 5). The personal data repository can select and consolidate the data to perform as the database's individual's consolidated entity.

Figure 6:
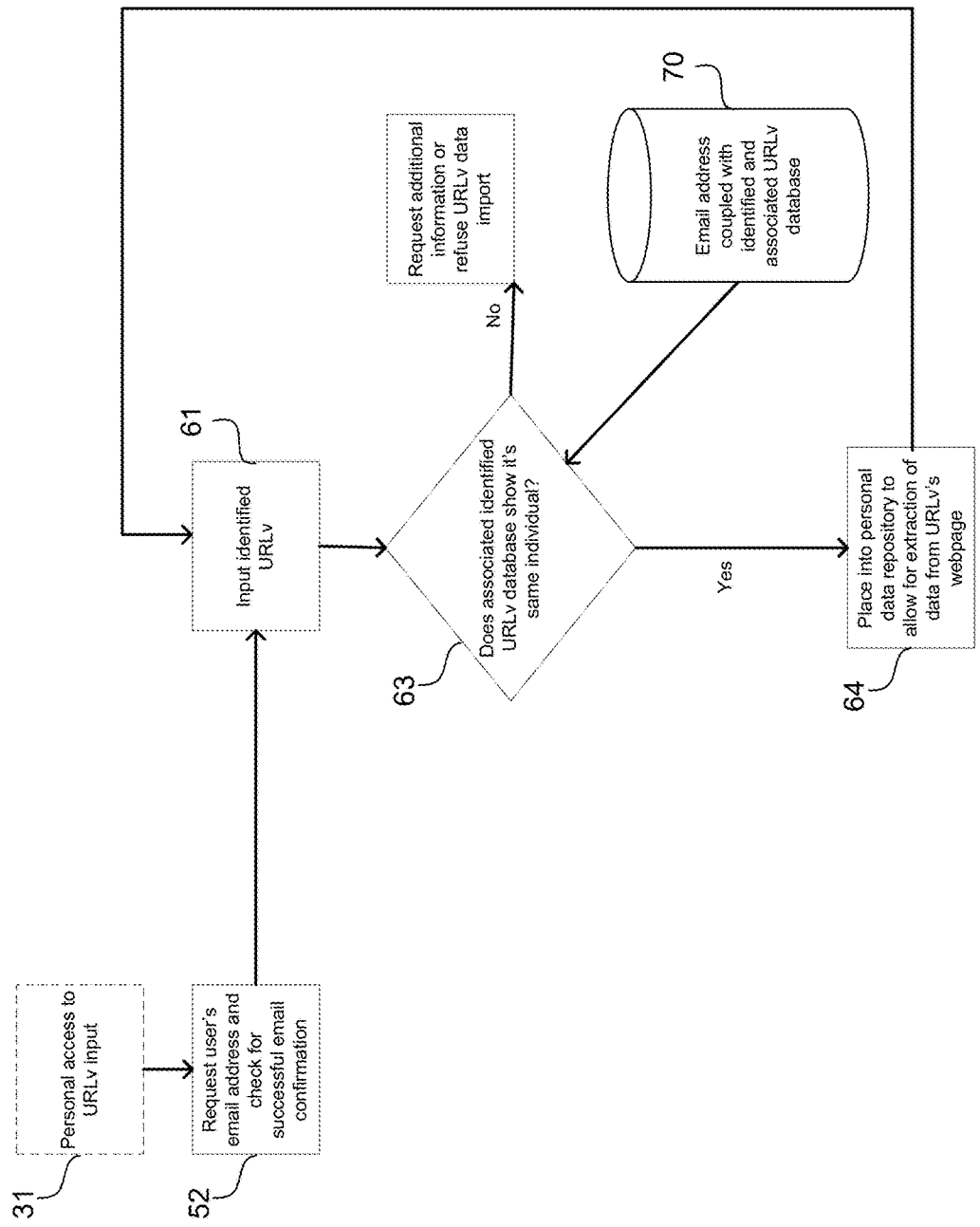

FIG. 6—Associated Identities URLvs Database with Email Address

The email address used in the confirmation method can be incorporated with the URLv associated identities database to form a new associations database ((70), FIGS. 4 and 5). Input of any known identity URLvs associated to the email address can now be acceptable URLv input ((61), (63), FIG. 6)) and bypass steps 52-58 of FIG. 5. FIG. 6 demonstrates that incorporation of additional individuals' factors can simplify URLv input and expand this invention's usage.

Figure 7:
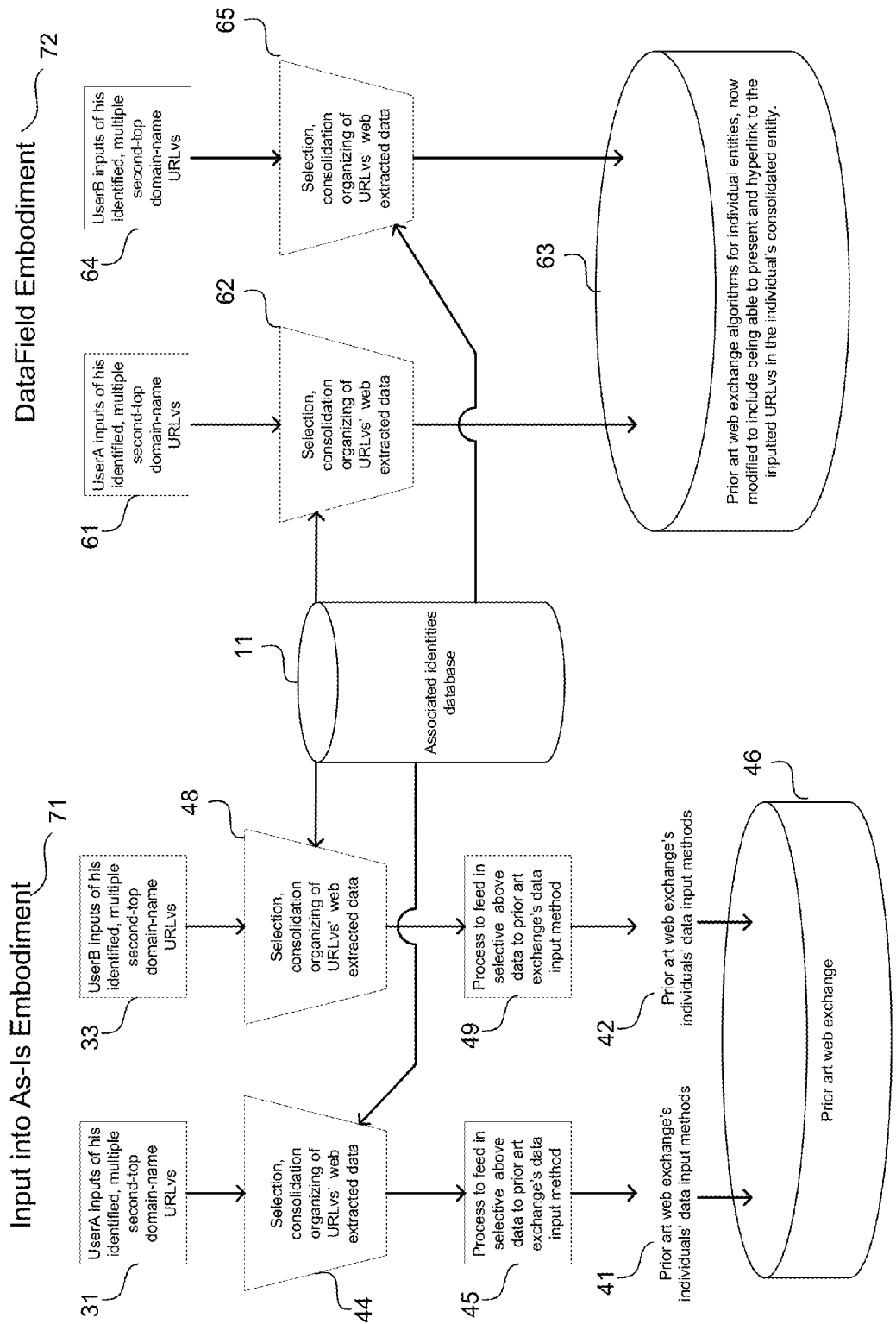

FIG. 7—Web Exchanges URLvs Input to Form Individual's Consolidated Entities

The lower left part of FIG. 7 shows an exchange's prior-art data input method. UserA and UserB manually inputs ((41), (42), FIG. 7) their data into the prior-art web exchange ((46), FIG. 7) to form their own individual consolidated entity. The web exchange's algorithms operate on these entities to create individuals' information exchange websites.

FIG. 7's left two columns show the "Input Into As-Is Embodiment". UserA inputs his identified URLvs with multiple second-top domain names ((31), FIG. 7) into his personal URLv access and personal database repository. His URLvs' web data are extracted, organized, and consolidated, and then selected ((44), FIG. 7) to be placed into an input process ((45), FIG. 7)) similar to the existing manual data input method ((41), FIG. 7). Very little programming is needed in the web exchange's core database system—simply adds an extra data input method. The associated identities database ((11), FIG. 7) enable the consolidation of an individual's differing identitied URLvs. UserB can do likewise ((33, 48, 49, 42), FIG. 7). The users' URLvs inputting is significantly faster than their manually inputting URLvs' webpages data, and users also gain data portability and easy-user-selectable data transfer capabilities.

FIG. 7's right two columns show the "DataField Embodiment". Here, the individual's consolidated entity additionally includes a data field for the URLvs and can hyperlink and present the URLvs ((63), FIG. 7).

EXCHANGE EXAMPLES eCommerce—dBay.com, a hypothetical auction website similar to eBay.com, uses proprietary web handle names for individual's representation in its web database system, and dBay users input products data manually. A modification is made into dBay's user's products input, such that a dBay user can additionally input his identified URLvs containing extractable products data, and the modification further confirms that user is authorized to use the inputted URLvs. The first URLv's confirmation is by checking with same second-top domain email address, and subsequent, different-identified URLvs, by checking with the associated identity database. After input, dBay extracts the URLvs' products data for use by the user's seller account.

As further explanation, the webpages of the above example URLvs Steve.ABC.com/Chevy and DEF.com/Steve/Ford carry transferable car products information using XML, HTML commentaries, formats described in SSIRA and Multi-ID, and other means including JavaScript Object Notation (JSON). Inputting into dBay.com using URLvs is faster than manually inputting in their webpages' numerous cars data. Steve further gains data portability by being able to input these URLvs easily to other eCommerce sites. Even if the URLvs transferred a portion of the data, Steve will save time, as he can edit the data before submission to dBay's prior-art input (as will be later seen in (30-32) in FIG. 8).

Matchmaking—hypothetical dMatch.com and dHarmony.com are similar to Match.com and eHarmony.com. Jane is authorized to use URLvs Jane.GHI.com/single-status, JKL.com/Jane/activities, and encoded URLv MNO.com/J46/preferences, and {Jane.GHI.com}, {JKL.com/Jane}, and {MNO.com/J46} are associated identities. dMatch.com and dHarmony.com, two popular dating websites, both want Jane to complete their sites' time-consuming dating questionnaires. Both dMatch and dHarmony now add this invention to their users' questionnaire input. Jane inputs into her dMatch.com's personal URLv access Jane.GHI.com/single-status and JKL.com/Jane/activities, and dMatch.com extracts the URLvs' web data to complete its required questionnaire. Jane submits into her dHarmony.com personal URLv access Jane.GHI.com/single-status and MNO.com/46/preferences, and dHarmony.com uses these two different URLvs for its questionnaire. Both dMatch.com and dHarmony.com checked the associated identities database before accepting Jane's URLvs. Notice Jane's data portability, as her dating profile Jane.GHI.com/single-status can be easily inputted into two web exchanges, saving Jane lots of time.

Social Networking Ronald, an engineer, has a URLv Linkedout.com/in/Ron/jobs (similar to Linkedin.com—a professionals networking website), an encoded URLv Facepages.com/~m34nd-id=ron/interests+activities (similar to Facebook.com, a social networking site), two URLvs from his engineering employer Ron.XYZEngineering.com/contacts and Ron.XYZEngineering.com/position, and email address Ron@XYZEngineering.com. Linkedout.com, Facepages.com, and XYZEngineering.com all support extractable data webpages, and the associated identities database has assigned identities {Linkedout.com/in/Ron}, {Facepages.com/+id=ron}, and {Ron.XYZEngineering.com} to Ronald.

Ronald wishes to add information about himself to social networking website AllOfMeSocialNetwork.com. He inputs these four URLvs, and AllOfMeSocialNetwork.com extracts their web data, prioritizes, consolidates and organizes these, and creates a single individual's consolidated entity using their web data and with an additional presented data field that includes these four URLvs. AllofMeSocialNetwork.com enables Ron's individual's consolidated entity (now with URLvs) to social network interact with other individuals' entities in same website, in a way that others can quickly understand his social activities and his business profile.

Similarly, if Ronald only inputted Linkedout.com/in/Ron/jobs and Facepages.com/~m34nd-id=ron/interests+activities URLvs, and not his employer's XYZEngineering.com's URLvs, into an employment website, such site could help him job-hunt, with input from only 2 URLvs. Ronald saves a lot of time, and the URLvs provided him with data portability.

Discussion forum. A large professional engineer discussion forum website, say ProEngineer.org, already exists, and in order to participate, an engineer needs to show his contacts information, tell a little about himself, and list his engineering specialty. Ron inputs Ron.XYZEngineering.com/contacts, Ron.XYZEngineering.com/position, and then inputs his identified URLv dMyspace.com/Ron, with his hobbies. The websites XYZEngineering.com and dMyspace.com (comparable to Myspace.com) both have extractable data webpages and identified URLv syntax. The associated identities database associates {Ron.XYZEngineering} and {dMyspace.com/Ron} as same person with email address Ron@XYZEngineering.com. Ron registers at ProEngineer.org using his email, Ron@XYZEngineering.com. ProEngineer.org checks that Ron.XYZEngineering.com/contacts, Ron.XYZEnginering/position, and dMyspace.com/Ron are the same individual using the associated identities URLvs-email-address database and then web extract these URLvs' data to create an individual's consolidated entity for Ron.

Using comparable processes as above, other individuals' exchange websites can be quickly populated with many individuals' data. Such sites can be other forms of eCommerce sites, alumni sites, many types of social networking sites, classified sites, blogging sites, microblogging sites, personal news generating sites, national defense, political and social sites, and more.

Figure 8:
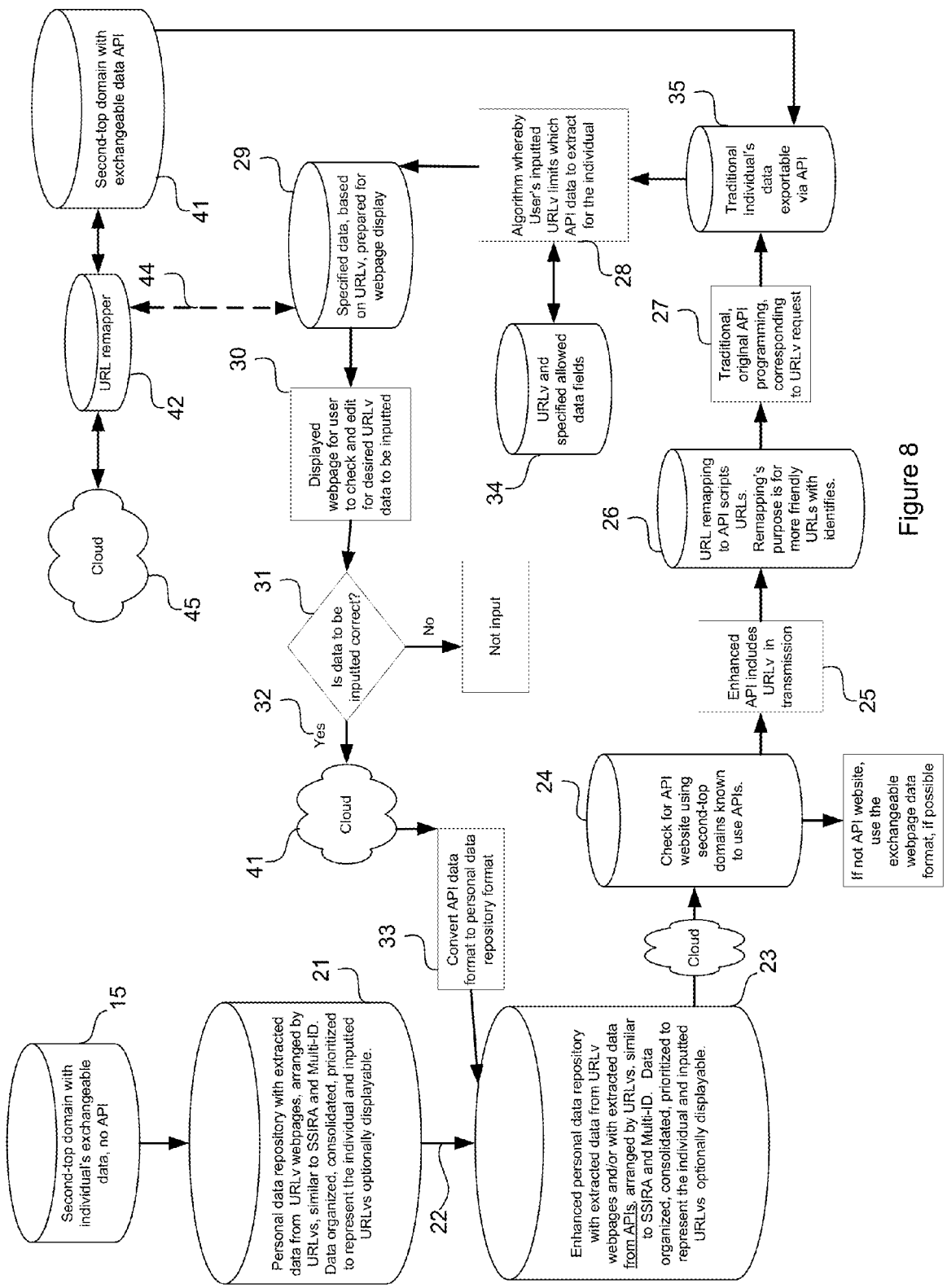

Coupling Application Programming Interfaces (APIs), FIG. 8

Many popular websites have web application programming interfaces (a.k.a. web APIs and hereafter APIs) for programmers to customize users' access to their database system's users' data; examples are Facebook.com's, Twitter.com's, and Meetup.com's APIs. We designate such websites, API websites. A user frequently couples his API website's user's access with the API programming routine to transfer his or her data to a targeted website.

Traditionally, to enable user selection, an API routine would present a webpage for the user to select which data field to transfer, the user selects, and the routine builds the API call. This embodiment changes this by using one simple inputted URLv to eliminate the traditional webpage field selections. For example, suppose a user wishes to transfer his telephone number. Traditionally, the web API routine presents a webpage with various click-button-selection fields. In a social media API type website, these fields can include name, address, social interactions, friends, zip code, age, telephone, degree of privacy, who can see, employer, and numerous data fields. The user eventually clicks the phone field, submits the request, and the API transfers the telephone number. Using this invention embodiment, the user selects a URLv, and the new API transfers selected data. For example, user submits Don.SiteWithAPI.com/tele and the API transfers Don's phone number.

In the preferred API embodiment, the previously-programmed, traditional API request routine is preserved and the embodiment adds the URLv, for example Don.SiteWithAPI.com/tele. Then, a new script in the API website uses the URLv Don.SiteWithAPI.com/tele to limit the API return data to Don's telephone number. Limiting data output can be accomplished by well-known ways of filtering unwanted data. Don, the user, gains an easy to make selective data transfer requests using URLvs.

FIG. 8 shows this enhanced-routine API. We'll start describing with this embodiment's components. First, an enhancement is added to a previous personal data repository ((21), FIG. 8 (similar to (21), FIG. 4)) containing previously-mentioned data from several second-top level domains ((15), FIG. 8, comparable to (15), FIG. 4). The enhanced new personal data repository ((23), FIG. 8) can web access to and can transmit some new coding for an API, including transmitting the URLv, and can transmit to a specified location that has a URL remapping database. Second, a "known API website names database" ((24), FIG. 8) is set up with names of second-top domain websites with APIs. (If the URL remapping database following ((26), FIG. 8) is bypassed or does not exist, this "known API website names database" further contains the URLs for API accesses.) Third, a URL remapping database ((26), FIG. 8) is set up that maps users' inputted easy-to-read-write URLvs to a URL that launches a script for a corresponding traditional API request, now added with this URLv to limit its API's output. Fourth, the URLv's same second-top domain with an API is chosen ((41), FIG. 8). Fifth, preferable but optional, another URL remapping database ((42), FIG. 8) at the chosen API site is set up such that it creates easy-to-read-write URLvs to match to web displays of such data ((44), FIG. 8). In another word, the data for the webpage display resulting from the URLv's API access ((29-30), FIG. 8) should be same as when the URLv is http: accessed ((42, 44, 45), FIG. 8)

As for the steps of this embodiment, starting at the enhanced personal data repository ((23), FIG. 8), a process step follows that checks whether a URLv inputted into this repository uses APIs, by checking the URLv's second-top domain names with the known API website names database ((24), FIG. 8). If so, the process web accesses, inclusive of the URLv, ((25), FIG. 8) to a remapping database ((26), FIG. 8) at a specified URL.

Users desire easy-to-read-write URLv names in their personal data repositories, and the URL remapping database ((26), FIG. 8) remaps these URLvs to a URL that launches a script for corresponding API request steps. This corresponding API script delivers the URLv's data fields' data, as would be generally displayable if web addressed ((29), (30), (42), (44), FIG. 8). For example, if URLv Mark.MNO.com/title is inputted, and http://Mark.MNO.com/title displays his title data field data, the mapped corresponding API script fetches Mark's same title data field data, as that displayed on http://Mark.MNO.com/title. That is, upon receiving the URLv, the URL remapping database remaps to an API script that returns equivalent individual's data fields' data, as if directly web accessed using the URLv.

The API website now also carries enhanced programming in which the URLv acts as a variable to limit the API's data export ((26), (27), (29), FIG. 8). This variable limitation can be accomplished by an added database that defines data field limitations with URLvs ((34), FIG. 8).

For example, suppose a traditional API routine to ABCarDealer.com initially enabled all of ABCarDealer.com's cars and sales representatives' data to be API exportable. When the URLv Joe.ABCarDealer.com/Chevy is added to the enhanced API routine, only Joe's Chevy cars' data is extracted. If the URLvs Joe.ABCarDealer.com/Chevy and Joe.ABCarDealer.com/Ford are added, the enhanced API extracts Joe's Fords and Chevys data. The data is then presented for user's review ((30, 31, 32)), FIG. 8), and if accepted, is inputted into user's enhanced personal data repository ((23), FIG. 8).

The enhanced API routine at the API website is created by retaining the original, traditional API request routine to extract data and then to limit data export by using the URLv and its database of limitations ((34), FIG. 8). Instead of rewriting an entirely new API request or API website routines, now, the requesting site only adds the user's inputted URLv, and the API website only adds a limiter ((28, 34, 29), FIG. 8) to its output step. The URL remapping database ((26), FIG. 8) ensure users and programmers of ease of use and simplicity.

Another example, ProEngineerAPI.org, an engineering community website, has users' personal data repositories that can access API, and ABCEngineering.com has an API. Paul inputs URLv Paul.ABCEngineering.com/contacts into his personal repository in ProEngineerAPI.org ((23), FIG. 8). ProEngineerAPI.org searches the API-websites-names database ((24), FIG. 8) and determines that ABCEngineering.com has an API with http://API.ABCEngineering.com as the API access. Now, the URLv Paul.ABCEngineering.com/contacts is sent along with ProEngineerAPI.org personal data repository's API request transmission ((25), FIG. 8) to http://API.ABCEngineering.com. API.ABCEngineering.com has a remapping database ((26), FIG. 8), and maps easy-to-read-write URLv, Paul.ABCEngineering.com/contacts to a web call URL that launches a corresponding API script. This routine uses the corresponding, traditional API approach ((27), (35) FIG. 8) but now at the return transmission step limits the exported data only to the data fields pertaining to the contacts information for Paul, Paul.ABCEngineering.com/contacts, ((28), (29), (34), FIG. 8).

Before finalizing the return data transmission, Ron can edit ((30), (31), FIG. 8). Upon Ron's approval ((32), FIG. 8), the data is set for input into his personal data repository ((23), FIG. 8). The personal data repository's data format is likely different from the API's extracted data format, and data format conversion will likely occur ((33), FIG. 8) before final input. Subsequently, all Ron's inputted URLvs and data in his personal data repository can be prioritized, consolidated, organized, and finally presented as a consolidated individual's entity object. As we can see, this invention embodiment can utilize both APIs and webpage-embedded exchangeable data, for easy-to-use URLv data input.

Other Embodiments

In FIG. 8's API interface embodiment, the associated identity database check can be added before URLv placement into personal data repository, to ensure that the individual is authorized to use the API identity. The user's edit of returned API data ((30-32), FIG. 8) and the API's website's own URL remapping ((42), FIG. 8) are optional.

The included URLv ((25), FIG. 8) can also be remapped ((26), FIG. 8) to entirely new API programming script, which can expand data returned, instead of limit ((28-29), FIG. 8)). Limiting is preferred because it is an efficient way to convert existing API routines to utilize this. Expansion of data fields' data received specified by URLvs is also an embodiment.

For clarity of explanation, this invention's preferred associated identities database uses primarily known identity URLvs. Multi-ID showed other association means are also usable, including probable identity URLvs and large quantities of unknown identity URLvs. These embodiments are included.

Methods other than email can confirm an individual is authorized by a second-top level domain, as used in FIG. 5's personal access. For example, in the initial confirmation steps ((53), (54) FIG. 5), the confirmation method could have been to change one of user's inputted URLvs to another file suffix or add new confirmation text code to URLv webpage. Also, browser cookies can be used for subsequent submissions.

In FIG. 5's embodiment, the web exchange does not initially contain the user's URLvs or email address, and has to create the first identified one through steps 52-58. Another embodiment is that the web exchange already contains and knows the user has identified URLvs, and bypasses steps 52 to 58.

In FIG. 5 (70), the inputted email address is coupled with the identified and associated URLv database to form a new individuals' associated identitied URLvs-email address database, which is later used in FIG. 6 (70). Characteristics other than email address (e.g., specific password), can also be coupled to form new individuals' associated database.

In FIG. 8's embodiment, it was explained earlier that the direct http: accessed URL ((42, 44, 45), FIG. 8) should be same data fields as that of API extracted ((29, 30), FIG. 8). Though ideally these would be same, the invention can also work if these are similar. For example, the direct http: accessed usually is designed to carry more web formatting than necessary in the API implementation. API implementation may also not use certain http: version data fields. Data fields' consistency with the http: version is desirable, but API data fields can differ.

In FIG. 8 step 26, the enhanced personal data repository ((23), FIG. 8) is designed to utilize the pre-existing API routines, and this is reflected in the URL remapping to different API scripts ((27), FIG. 8). It is also possible that a single API routine can be set to return all possible desired data, and in such case, only one API routine is used, coupled with the URLv to limit data. Also, the URLv data limitation can be made prior to or after ((41), FIG. 8), the web return of the data to the personal data repository. It is also possible to bypass the URL remapping database and access directly via the URL.

Hardware and Software

As for computing hardware, a preferred embodiment includes several users on personal computers with access to an Internet-connected browser and an Internet-connected Apache-Linux server computer running Apache web server (manufactured by Apache Software Foundation). On this web server is a multi-user database, such as mySQL (manufactured by Sun Microsystems) and languages and/or PHP (manufactured by the PHP Group). Several Domain Name Servers, as part of the Internet, may also be involved. Several more web servers serving websites with domain names are used.

The personal and server computers may be an IBM PC-compatible computer. Many other types of computing devices can be used including, for users, any device with functionality to display URLs and connect to the Internet, for example, smart phones, portable tablets, cellular phones, laptops, Windows PCs, attached UNIX computer terminals, and more. The type of server software can be any web server software, including web servers from Microsoft and other web UNIX-flavor web servers. Programming languages can include Visual Basic, C, C++, Perl, ASP, Outlook's scripting language, PHP, and numerous others. Web databases can include mySQL, Oracle Database, Microsoft's SQL Server, and more.

What is claimed is:

1. A method of inputting personal data into an individual's consolidated entity of a web individuals' exchange in which an individual inputs a URLv containing an identity into said consolidated entity's personal URLv input access, said URLv's identity is checked for association with said individual, and if confirmed, said URLv is associated with said individual's consolidated entity's data, the method steps comprising of:
    providing a plurality of URLvs each containing a first second-top domain name and a known identity of said individual;
    providing a URLv containing a second second-top domain name and a known identity of said individual;
    providing said URLvs of said first and second second-top domain name with addressed webpages containing said individual's data;
    providing a web individuals' exchange with individual's consolidated entities that can exchange data with said exchange's other individual's consolidated entities wherein each said individual's consolidated entities has a personal URLv input access;
    providing an associated identity means that associates an individual with his known URLv identities wherein said means includes said individual associated with said known identities of said first and second second-top domain name;
    providing Internet-connected processors and applications to generate and host said URLvs' webpages, said web individuals' exchange, said associated identity means, and said individual's consolidated entities;
    inputting said plurality of URLvs of first second-top and said URLv of second second-top domain name into said individual's consolidated entity's personal URLv input access;
    deriving identities of said inputted URLvs;
    confirming said identities belong to same individual, using associated identity means;
    associating said URLvs with confirmed identities to said individual's consolidated entity;
    whereby the same individual's multiple identified URLvs from different second-top domain names can provide multiple personal data for said individual's consolidated entity in a web exchange and wherein such URLvs are confirmed as belonging to the same individual.

2. The method of claim 1, wherein said associated identity means includes an associated identity database.

3. The method of claim 1, wherein said associated identity means includes said individual's email address.

4. The method of claim 1, further comprising:
    said individual's consolidated entity's inputted URLvs are web accessible, and said inputted URLvs' web data is extracted and stored as data fields within said individual's consolidated object entity.

5. The method of claim 4, further comprising:
    said inputted web data is consolidated, organized, and presented as web data of the said individual's consolidated object entity;
    whereby an individual's consolidated object entity is quickly data populated through inputs of his or her identified and same-individual-confirmed URLvs of differing second-top domain names, and the inputted data which is repetitive is further consolidated and organized for easier reading.

6. A method of personally selecting limitations on received data from an Application Programming Interface (API) website by inputting an identified URLv into a web exchange's individual's consolidated entity, the method comprising of:
  providing a plurality of URLvs each containing a first second-top domain name and a known identity of an individual;
  providing a web individuals' exchange with individual's consolidated entities that can exchange data with said exchange's other individual's consolidated entities wherein each said individual's consolidated entity has a URLv input access;
  providing an API website wherein API access can transmit said API website's data;
  providing a database containing said URLvs wherein each has its associated scripts for API access and for limiting received API data;
  providing Internet-connected processors and applications to generate and host said web individuals' exchange, said API website, said URLvs' webpages, and said database containing URLvs;
  inputting a said URLv into an individual's consolidated entity's URLv access;
  activating said database's said inputted URLv's associated API access script;
  receiving said API access's returned data;
  activating said database's said inputted URLv's associated script for limiting said API access's returned data;
  inputting said limited data into said individual's consolidated entity;
  whereby, an individual user can selectively input personal data originating from an API website into an individual's consolidated entity through use of a user-understandable URLv input instead of complex-programming API coding.

7. The method of claim 6, further comprising:
  inputting a second said URLv into said individual's consolidated entity's URLv access;
  deriving identities of said first and second inputted URLvs;
  confirming said identities are same;
  activating said database's said second-inputted URLv's associated API access script;
  receiving said second-inputted URLv's API's returned data;
  activating said database's said second-inputted URLv's associated script for limiting said second-inputted URLv's API's returned data;
  inputting said limited returned data of said second-inputted URLv into said individual's consolidated entity;
  whereby, a user can selectively input different URLvs of same identity in order to add differing portions of an API website's data into an individual's consolidated entity in a web exchange and wherein the web exchange can confirm these inputted URLvs belong to same identity.

8. The method of claim 7, wherein said first and second inputted URLvs have the same second-top domain name as the API website.

9. The method of claim 7, wherein said inputted limited returned data of first and second URLvs are further consolidated, organized, and presented.

10. A method of inputting personal data into an individual's consolidated entity of a web individuals' exchange in which URLvs containing identities of different second-top domain names are inputted, their identities checked for association with an individual, and if confirmed, said URLvs' data are web accessed, extracted, and inputted as data for said individual's consolidated entity, wherein at least one said URLv involves an API access ,the method steps comprising of:
  providing a plurality of URLvs each containing a first second-top domain name and a known identity of said individual;
  providing a URLv containing a second second-top domain name and a known identity of said individual;
  providing a web individuals' exchange with individual's consolidated entities that can exchange data with said exchange's other individual's consolidated entities wherein each said individual's consolidated entity has a URLv input access;
  providing an API website wherein API access can transmit said API website's data;
  providing a database containing said URLvs of first second-top domain name wherein said database's URLv has associated scripts for said API access and for limiting received said API data;
  providing means for exchanging personal data for said URLv of second second-top domain name;
  providing an associated identity means that associates an individual with his said known URLv identities wherein said means includes said individual associated with said known identities of said first and second second-top domain name;
  inputting said plurality of URLvs of first second-top and said URLv of second second-top domain name into said individual's consolidated entity's personal URLv input access;
  deriving identities of said inputted URLvs of said first and second second-top domain names;
  confirming said identities belong to same individual, using associated identity means;
  activating said database's said first second-top domain name URLvs' API access scripts,
  receiving said API accesses' returned data,
  activating said database's said first second-top domain name URLvs' scripts for limiting API returned data;
  inputting said limited data into said individual's consolidated entity;
  activating means for exchanging personal data for said URLv of second second-top domain name;
  inputting said personal data for the second second-top domain name URLv into said consolidated entity;
  whereby, data from confirmed-same-individual, different-second-top-domain URLvs of an individual are placed into his or her individual's consolidated entity in a web exchange, wherein said data includes limited data from API website, and whereby individual user can use understandable URLvs instead of complex-programming-involved APIs to accomplish this input.

11. The method of claim 10, wherein said associated identity means includes an associated identity database.

12. The method of claim 10, wherein said associated identity means includes said individual's email address.

13. The method of claim 10, further comprising:
  said inputted web data is consolidated, organized, and presented as web data of the said individual's consolidated object entity;
  whereby individual's consolidated object entities are quickly data populated through inputs of his identified URLvs of differing second-top domain names, and that data which is repetitive is consolidated, and finally organized for easier reading.

14. The method of claim 10, wherein means for exchanging personal data includes XML, JavaScript Object Notation, and HTML coded data for exchanging.

15. The method of claim 10, wherein means for exchanging personal data includes API.

16. The method of claim 10, wherein said URLvs of first second-top domain name have same second-top domain name as API website.

* * * * *